United States Patent [19]

Ono et al.

[11] Patent Number: 5,196,261
[45] Date of Patent: Mar. 23, 1993

[54] COMPOSITE MATERIAL HAVING AN EXPANDED, CURED EPOXY RESIN LAYER, METHOD OF PRODUCING SAME AND POWDER EPOXY RESIN COMPOSITION FOR FORMING SUCH AN EXPANDED LAYER

[75] Inventors: Kazuya Ono, Tokyo; Katsuji Kitagawa, Kasukabe; Seitaro Iwamoto, Soka; Mikio Osa, Saitama; Takeshi Watanabe, Soka, all of Japan

[73] Assignee: Somar Corporation, Japan

[21] Appl. No.: 919,276

[22] Filed: Jul. 27, 1992

[30] Foreign Application Priority Data

Jul. 31, 1991 [JP] Japan .................................. 3-216077

[51] Int. Cl.$^5$ .................... B32B 3/26; B32B 27/38; B32B 5/14
[52] U.S. Cl. .............................. 428/310.5; 427/373; 428/314.4; 428/318.6; 428/318.8; 428/319.1; 428/417; 428/418; 521/51; 521/135
[58] Field of Search ................... 427/373; 428/310.5, 428/314.4, 314.8, 318.6, 318.8, 319.1, 413, 417, 418; 521/51, 135

[56] References Cited

U.S. PATENT DOCUMENTS

| 4,378,395 | 3/1983 | Asoshima et al. | 428/413 |
| 4,399,174 | 8/1983 | Tanaka et al. | 428/319.3 |

FOREIGN PATENT DOCUMENTS

| 724552 | 12/1965 | Canada | 428/318.6 |
| 2207803 | 6/1974 | France | 428/318.8 |
| 2019313 | 10/1979 | United Kingdom | 428/319.9 |

Primary Examiner—William J. Van Balen
Attorney, Agent, or Firm—Lorusso & Loud

[57] ABSTRACT

A composite material having a substrate and an expanded, cured layer of an epoxy resin composition which is provided over a surface of the substrate and in which a major portion of the cells are present in a location adjacent to the interface between the substrate and the expanded layer and substantially no cells are present on the top surface portion of the expanded layer. The epoxy resin composition includes an acid anhydride curing agent and an alkali metal carbonate blowing agent. The composition is coated over the substrate and the coating is heated to sure and expand the composition while maintaining the top surface of the coating below the expansion temperature.

12 Claims, No Drawings

COMPOSITE MATERIAL HAVING AN EXPANDED, CURED EPOXY RESIN LAYER, METHOD OF PRODUCING SAME AND POWDER EPOXY RESIN COMPOSITION FOR FORMING SUCH AN EXPANDED LAYER

This invention relates to a composite material having an expanded, cured epoxy resin composition layer and to a method for preparing such a composite material. The present invention also pertains to a powder epoxy resin composition useful for forming such an expanded layer.

Known expandable powder epoxy resin composition uses an organic blowing agent such as azodicarboamide. Because of the presence of closed cells, a cured layer obtained from such an expandable epoxy resin composition is superior in resistance to mechanical and thermal shocks as compared with ordinary, non-expanded layer. However, the expanded layer is inferior with respect to the surface hardness, mechanical strength and moisture resistance.

Incidentally, the recent trend in the field of small-sized electric motors is toward the use of a small armature with tight windings of a relatively thick wire. In this case, the coil wire is wound around the armature after the armature has been coated with an insulating resin. Such an insulating resin layer should meet with the following criteria:

(1) to exhibit high resistance to mechanical shocks and to be hardly cracked or broken;

(2) to exhibit high surface strength even at high temperatures and to withstand the tightening tension of the windings; and (3) to exhibit high resistance to thermal shocks and to be hardly cracked, broken or separated even exposed to repeated high and low temperature conditions.

Known expandable or unexpandable epoxy resin compositions cannot satisfy all of the above criteria.

The present invention has been made to provide a composite material having an expanded, cured layer of an epoxy resin composition, which layer meets with the above criteria (1)–(3).

In accordance with one aspect of the present invention, there is provided a composite material comprising a substrate and an expanded, cured layer of an epoxy resin composition provided over a surface of said substrate and having a closed cellular structure and an expansion ratio of 7–35%, wherein a majority of the cells of said expanded layer are present in a portion adjacent to the interface between said substrate and said expanded layer and substantially no cells are present in a portion adjacent to the outer surface of said expanded layer.

In another aspect, the present invention provides a method of forming an expanded, cured layer over a surface of a substrate, comprising the steps of:

(a) providing an expandable, epoxy resin composition which is hardenable at a temperature higher than a curing temperature and which is expandable at a temperature higher than an expansion temperature which is higher than said curing temperature;

(b) applying said composition over said surface of said substrate to form a coating of said composition over said surface; and (c) heating said substrate at a temperature higher than said expansion temperature while maintaining the top surface of said coating at a temperature lower than said expansion temperature but higher than said curing temperature, so that said coating is cured and expanded to form said expanded, cured layer over said surface of said substrate with the top surface of said layer being maintained unexpanded, preceded by step (b) and effected by high frequency heating.

The present invention also provides a powder epoxy resin composition comprising an epoxy resin, an acid anhydride curing agent, and an alkali metal carbonate, said alkali metal carbonate being present in an amount of 0.1–2 % by weight per 100 parts by weight of said epoxy resin.

The present invention will now be described in detail below.

As the epoxy resin to be used in the present invention, there may be used any epoxy resin which is solid at 25° C. Illustrative of suitable epoxy resins are a diglycidyl ether of bisphenol A, a diglycidyl ester of bisphenol F, a cresol novolak epoxy resin, a phenol novolak epoxy resin, an alkylphenol novolak epoxy resin, an alicyclic epoxy resin, a hydrogenated diglycidyl ether of bisphenol A, a hydrogenated diglycidyl ether of bisphenol AD, a diglycidyl ether of a polyol such as propylene glycol or pentaerythrytol, an epoxy resin obtained by reaction of an aliphatic or aromatic carboxylic acid with epichlorohydrin, an epoxy resin obtained by reaction of an aliphatic or aromatic amine with epichlorohydrin, a heterocyclic epoxy resin, a spiro-ring containing epoxy resin and a resin modified with an epoxy group. These epoxy resins may be used singly or as a mixture of two or more thereof. A liquid epoxy resin may be used in combination with a solid epoxy resin as long as the resulting powder composition does not cause blocking.

As the curing agent for the above epoxy resin, an aliphatic, aromatic or hydroarcmatic acid anhydride is used. Examples of the acid anhydrides include phthalic anhydride, trimellitic acid anhydride, pyromellitic dianhydride, 3,3',4,4'-benzophenonetetracarboxylic dianhydride, ethylene glycol bisanhydrotrimellitate, glycerol trisanhydrotri-mellitate, 5-(2,5-dioxotetrahydrofuryl)-3-methyl-3-cyclohexene-1,2-dicarboxylic anhydride, tetrahydrophthalic anhydride and 4,4'-oxydiphthalic anhydride.

If desired, the above acid anhydride curing agent may be used together with other curing agents such as of a mercaptan-type, an amine-type, a polyamide-type, a boron-type, a dicyandiamide-type, a hydrazide-type, an imidazole-type, a phenol-type or an amineimide-type. Of these, the use of a phenol-type curing agent is preferred. The curing agent is used in such an amount so that the functional group thereof is present in an amount of generally 0.5–1.5 equivalents, preferably 0.7–1.2 equivalents per equivalent of the epoxy group.

The phenol-type curing agent suitably used in conjunction with the acid anhydride curing agent is a product obtained by reaction of a phenol compound with formaldehyde and containing at least two hydroxyl groups. Illustrative of suitable phenol resins are phenol novolak resins, cresol novolak resins, t-butylphenol novolak resins, octylphenol novolak resins, nonylphenol novolak resins and bisphenol novolak resins. These phenol resins may be used singly or as a mixture of two or more thereof. A phenol resin obtained by reaction of two or more different phenol compounds selected, for example, from bisphenol A, bisphenol F, butylphenol and nonylphenol, with formaldehyde may also be used for the purpose of the present invention. The amount of the phenol resin is generally 0.05-0.8 equivalent per equivalent of the epoxy group.

The powder epoxy resin composition according to the present invention is characterized in the use of an alkali metal carbonate as a blowing agent. The alkali metal carbonate by itself is not decomposed at a temperature of, for example, 200° C. When heated at 200° C. in the presence of an acid anhydride, however, the alkali metal carbonate is decomposed to generate carbon dioxide. The rate of the generation of carbon dioxide is increased with the increase of the temperature and becomes high at a temperature higher than that temperature which is lower by about 40° C. than the melting point of the acid anhydride. For example, when the acid anhydride has a melting point of 225° C., the generation of carbon dioxide by the decomposition of the alkali metal carbonate occurs significantly at a temperature of 185° C. or more. The alkali metal carbonate also serves to shorten the gel time of the composition.

Examples of alkali metal carbonates include sodium carbonate, potassium carbonate and lithium carbonate. These carbonates are generally used in the form of an anhydrous form. The amount of the alkali metal carbonate is 0.1-2 parts by weight, preferably 0.5-1.5 parts by weight, per 100 parts by weight of the epoxy resin. Generally, the alkali metal carbonate is used in an amount of 0.05-0.5 mole, preferably 0.1-0.3 mole per mole of the acid anhydride.

If desired, a curing accelerator may be incorporated into the composition of the present invention. Illustrative of suitable curing accelerators are tertiary amines such as triethylamine, N,N-dimethylbenzylamine, 2,4,6-tris(dimethylaminomethyl)phenol and N,N-dimethylaniline; imidzole compounds such as 2-methylimidazole and 2-phenylimidazole; triazine salts, cyanoethyl salts and cyanoethyltrimellitic acid salts of imidazole compounds; metal salts such as zinc acetate and sodium acetate; quarternary ammonium salts such as tetraammonium bromide; amides; peroxides; azo compounds; cyanates; isocyanates; phenol novolak salts of 1,8-diazabicyclo[5,4,0]undec-7-ene; and triphenylphosphine. The amount of the curing accelerator is generally in an amount of 0.05-10 parts by weight, preferably 0.1-5 parts by weight per 100 parts by weight of a total of the epoxy resin and the mixed maleimide.

The thermosetting powder composition of the present invention may optionally contain an inorganic filler such as calcium carbonate, magnesium carbonate, silica, alumina, talc, clay, mica or an surface treated product (treated, for example, with a silane coupling agent or polysiloxane) of the above, or an organic filler such as a polyimide resin. The filler is used in an amount of 30-270 parts by weight, preferably 100-250 parts by weight per 100 parts by weight of the epoxy resin. Good results can be obtained when two kinds of fillers F1 and F2 with different average particle diameters D1 and D2, respectively, are used. The diameter D1 is 0.5-100 μm, preferably 0.5-80 μm while D2 is less than 0.5 μm, preferably less than 0.1 μm. The ratio by weight of F1 to F2 is 99.7:0.3 to 87:13, preferably 99.5:0.5 to 90:10.

The powder coating composition of the present invention may additionally contain one or more additives. Such additives include, for example, a flame retardant such as hexabromobenzene, antimony trioxide or tetrabromobisphenol A; a pigment such as carbon black, titanium oxide, red iron oxide or chromium oxide; a coupling agent, such as of a zirocoaluminum type, a silane type or a titanium type; a leveling agent such as an acrylic acid ester oligomer; a resin such as a butyral resin or a polyester; and a rubber such as carboxy-terminated butadiene acrylonitrile copolymer rubbers and nitrile-butadiene rubbers.

The epoxy resin composition of the present invention is preferably a powder including 100 parts by weight of an epoxy resin, 5-35 parts by weight of an acid anhydride, 2-30 parts by weight of a phenol resin, 0.05-5 parts by weight of a curing accelerator, 130-270 parts by weight of an inorganic filler, and 0.1-2 parts by weight of an alkali metal carbonate. The above composition can give a cured, expanded body which has excellent resistance to water, thermal shocks or mechanical shocks and excellent mechanical properties. The expansion ratio of the cured body may be controlled by controlling the curing temperature.

The composite material of the present invention may be obtained by applying the above epoxy resin composition, hardenable at a temperature higher than a curing temperature and expandable at a temperature higher than an expansion temperature which is higher than the curing temperature, to a surface of a substrate to form a coating of the composition over the surface thereof and heating the substrate to effect the curing and expansion of the coating.

The coating may be carried out in any known manner such as by the fluidized bed method, the electrostatic coating method and the spray coating method. The substrate may be formed of a metal or a ceramic and may be of any desired shape such as pipe, rod, plate, coil or a wound wire. Electric parts, armatures and coils are typical examples of the substrate.

The heating of the substrate should be performed at a temperature higher than the expansion temperature while maintaining the top surface of the coating at a temperature lower than the expansion temperature but higher than the curing temperature, so that the coating is cured and expanded to form the expanded, cured layer over the surface of the substrate with the top surface of the layer being maintained unexpanded.

The heating of the substrate may be carried out after the coating has been formed. Alternatively, the substrate may be preheated before the application of the powder coating composition thereto. The heating may be performed by any known manner using, for example, an oven, a high frequency induction heater or an electrical heater. It is preferred that the substrate be heated at a temperature T (° C.) in the following range:

$$MP - 40 \leq T \leq MP + 50$$

wherein MP is the melting point of the acid anhydride curing agent.

It is important that the deposits of the coating composition on the substrate should not be heated uniformly in the direction of the thickness thereof. Thus, the curing and expansion of the coating are carried out by heating the substrate while maintaining the outer surface of the coating below the expansion temperature. By this, the expansion does not occur uniformly. Rather, a major portion of the cells of the cured, expanded layer are present in a portion adjacent to the interface between the cured layer and the substrate while substantially no cells are present in a portion adjacent to the outer surface of the cured layer. The outer surface of the cured layer is thus flat and smooth and has a high hardness. Yet, the cured layer as a whole has a high resistance to thermal or mechanical shocks because of the presence of closed cells. The expansion ratio of the cured layer is generally 7–35%, preferably 10–30%. The expansion ratio R (%) is expressed:

$$R = (A - B)/A \times 100$$

where A and B represent apparent densities of uncured and cured layers, respectively.

In the composite material according to the present invention, generally at least 60%, preferably at least 70% of the total volume of the pores (cells) of the expanded layer are ascribed to the cells which are present at positions closer to the interface between the expanded layer and the substrate than to the outer surface of the expanded layer.

The following examples will further illustrate the present invention.

Example 1

An epoxy resin powder composition having the formulations shown in Table 1 was prepared. The compositions was then tested for evaluating performances thereof in the manner described hereinafter. The results are also summarized in Table 1. In Table 1, the amounts are part by weight and the trademarks and abbreviations are as follows:

Epoxy resin

EPIKOTE 1004: Diglycidyl ether of bisphenol A; manufactured by Yuka-Shell Epoxy Inc.; epoxy equivalent: 925

E180S75: o-Cresol novolak epoxy resin; manufactured by Yuka-Shell Epoxy Inc.; epoxy equivalent: 211

Curing agent

Acid anhydride: 3,3',4,4'-benzophenonetetracarboxylic anhydride, melting point: 225° C.

Phenol resin: o-cresol novolak resin; OCN-130 (manufactured by Nippon Kayaku K. K.), softening point: 130° C.

Curing accelerator

DBU: Phenol novolak resin salt of 1,8-diazabicyclo[5,4,0]undec-7-ene, Ucat SA831 (manufactured by Sun Apro K. K.)

Filler

Ca-carbonate: Calcium carbonate, average particle diameter: 6.5 μm, KC-30 (manufactured by Bihoku Funka Kogyo K. K.)

Light Ca: Light calcium carbonate, average particle diameter: 0.07 μm, HOMOCAL D (manufactured by Shiraishi Kogyo K. K.)

Leveling agent

Acrylic polymer: Acrylic ester polymer, XK-21 (manufactured by Nihon Carbide Kogyo K. K.)

Blowing agent

Na-carbonate: Sodium carbonate (ground and dried at 150° C. for 1 hour)

Test methods are as follows:

(1) Gel Time:

In accordance with JIS C2104, sample powder composition is placed in a circular depressed portion of a hot metal plate maintained at 200° C. The period of time required for the sample to gel is measured.

(2) Impact Resistance:

Sample powder composition is applied by a fluidized bed coating method to a thickness of 0.5 mm onto an iron plate (60 mm × 60 mm × 3 mm) preheated to 230° C. The resulting plate is allowed to stand at room temperature for 30 seconds to complete the gellation of the coating. Thereafter, the coated plate is heated at 200° C. for 30 minutes in an oven to effect post curing. After cooling to room temperature, a weight is dropped on the coated plate from a height of 500 mm using a duPont type impact tester to evaluate the degree of formation of cracks or breakage. The evaluation is rated as follows:

A: No crack or breakage of the cured layer occurs
B: Crack or breakage slightly occurs
C: Crack or breakage considerably occurs (3) Resistance to Thermal Shock:

Sample powder composition is applied, by a fluidized bed coating method, to a thickness of 0.5 mm onto a surface of a motor armature (slot diameter: 55 mm, stacking thickness: 40 mm, slot width: 3 mm, number of slots: 14, shaft diameter: 8 mm) preheated to 230° C. The resulting armature is allowed to stand at room temperature for 30 seconds to complete the gellation of the coating. Thereafter, the coated body is heated at 200° C. for 30 minutes in an oven to effect post curing. The coated body is subjected to 100 cycles of thermal shocks with each cycle including heating at 125° C. for 1 hour and cooling at −40° C. for 1 hour. Thereafter, the coating is observed to evaluate the degree of cracks or breakage. The evaluation is rated as follows:

A: No crack or breakage of the cured layer occurs
B: Crack or breakage slightly occurs
C: Crack or breakage considerably occurs (4) Expansion ratio:

Sample composition is pressed at 150° C. under 47 kg/cm² for 15 minutes to form a disc having a thickness of 3 mm. The disc is cured at 150° C. for 60 minutes to obtain an unexpanded disc. The density (A) of the unexpanded disc is then measured. The same sample powder composition is applied by a fluidized bed coating method to a thickness of about 0.5 mm onto an iron plate (100 mm × 100 mm × 3 mm) treated with a mold release agent and preheated to 230° C. The resulting plate is allowed to stand at room temperature for 30 seconds to complete the gellation of the coating. Thereafter, the coated plate is heated at 200° C. for 30 minutes in an oven to effect post curing. The expanded coating is peeled from the plate and is measured for its density (B). Expansion ratio (R) is calculated according to the above mentioned equation.

The expanded coating obtained in the above Expansion Ratio measurement was cut and the cross section was observed by a microscope. A majority of cells were found to be present in a region adjacent to the surface which had been contacted with the iron plate. Substantially no cells were found in a region adjacent to the opposite surface.

COMPARATIVE EXAMPLE 1

Example 1 was repeated in the same manner as described except that the epoxy resin coating composition contained no sodium carbonate. The results are shown in Table 1. Because of the air entrapped in the powder coating composition, the coating is slightly expanded notwithstanding the absence of sodium carbonate.

TABLE 1

|  | Example 1 | Comp. Ex. 1 |
|---|---|---|
| Epoxy resin | | |
| EPIKOTE 1004 | 90 | 90 |
| E180S75 | 10 | 10 |
| Curing agent | | |
| Acid anhydride | 10.8 | 10.8 |
| Phenol resin | 8.5 | 8.5 |
| Curing accelerator | | |
| DBU | 0.6 | 0.6 |
| Filler | | |
| Ca-carbonate | 200 | 200 |
| Light Ca | 6 | 6 |
| Leveling agent | | |
| Acrylic polymer | 0.3 | 0.3 |
| Blowing agent | | |
| Na-carbonate | 0.5 | — |
| Gel Time (sec) | 16 | 18 |
| Impact Resistance | A | C |
| Resistance to Thermal Shock | A | B |
| Expansion ratio (%) | 16.7 | 5.6 |
| Apparent density (g/cm$^3$) | | |
| Unexpanded | 1.80 | 1.80 |
| Expanded | 1.50 | 1.70 |

EXAMPLE 2

The composition obtained in Example 1 was tested for its impact resistance, thermal shock resistance and expansion ratio in the same manner as that in Example 1 except that the preheating temperature was lowered to 200° C. The results are shown in Table 2.

EXAMPLE 3

The composition obtained in Example 1 was tested for its impact resistance, thermal shock resistance and expansion ratio in the same manner as that in Example 1 except that the preheating temperature was increased to 250° C. The results are shown in Table 2.

TABLE 2

|  | Example 2 | Example 3 |
|---|---|---|
| Impact Resistance | A | A |
| Resistance to Thermal Shock | A | A |
| Expansion ratio (%) | 7.8 | 28.3 |
| Apparent density (g/cm$^3$) | | |
| Unexpanded | 1.80 | 1.80 |
| Expanded | 1.66 | 1.29 |

What is claimed is:

1. A composite material comprising a substrate and an expanded, cured layer of an epoxy resin composition provided over a surface of said substrate and having a closed cellular structure and an expansion ratio of 7-35%, wherein a majority of the cells of said expanded layer are present in a portion adjacent to the interface between said substrate and said expanded layer and substantially no cells are present in a portion adjacent to the outer surface of said expanded layer.

2. A composite material as set forth in claim 1, wherein said epoxy resin composition includes an epoxy resin, an acid anhydride curing agent, and an alkali metal carbonate, said alkali metal carbonate being present in an amount of 0.1-2% by weight based on said epoxy resin.

3. A composite material as set forth in claim 1, wherein said epoxy resin composition is powder including 100 parts by weight of an epoxy resin, 5-35 parts by weight of an acid anhydride, 2-30 parts by weight of a phenol resin, 0.05-5 parts by weight of a curing accelerator, 130-270 parts by weight of an inorganic filler, and 0.1-2 parts by weight of an alkali metal carbonate.

4. A composite material as set forth in claim 1, wherein said substrate is made of a metal or a ceramic.

5. A method of forming an expanded, cured layer over a surface of a substrate, comprising the steps of:
   (a) providing an expandable, epoxy resin composition which is hardenable at a temperature higher than a curing temperature and which is expandable at a temperature higher than an expansion temperature which is higher than said curing temperature;
   (b) applying said composition over said surface of said substrate to form a coating of said composition over said surface; and
   (c) heating said substrate at a temperature higher than said expansion temperature while maintaining the top surface of said coating at a temperature lower than said expansion temperature but higher than said curing temperature, so that said coating is cured and expanded to form said expanded, cured layer over said surface of said substrate with the top surface of said layer being maintained unexpanded.

6. A method as set forth in claim 5, wherein said epoxy resin composition includes an epoxy resin, an acid anhydride curing agent, and an alkali metal carbonate, said alkali metal carbonate being present in an amount of 0.1-2% by weight based on said epoxy resin.

7. A method as set forth in claim 5, wherein said epoxy resin composition is powder including 100 parts by weight of an epoxy resin, 5-35 parts by weight of an acid anhydride, 2-30 parts by weight of a phenol resin, 0.05-5 parts by weight of a curing accelerator, 130-270 parts by weight of an inorganic filler, and 0.1-2 parts by weight of an alkali metal carbonate.

8. A method as set forth in claim 5, wherein step (b) is preceded by step (c).

9. A method as set forth in claim 5, wherein step (c) is preceded by step (b) and effected by high-frequency heating.

10. A powder epoxy resin composition comprising an epoxy resin, an acid anhydride curing agent, and an alkali metal carbonate, said alkali metal carbonate being present in an amount of 0.1-2% by weight based on said epoxy resin.

11. A composition as set forth in claim 10, wherein said alkali metal carbonate is lithium carbonate or sodium carbonate.

12. A powder epoxy resin composition comprising 100 parts by weight of an epoxy resin, 5-35 parts by weight of an acid anhydride, 2-30 parts by weight of a phenol resin, 0.05-5 parts by weight of a curing accelerator, 130-270 parts by weight of an inorganic filler, and 0.1-2 parts by weight of an alkali metal carbonate.

* * * * *